United States Patent
Kamioka et al.

(10) Patent No.: US 8,732,099 B2
(45) Date of Patent: May 20, 2014

(54) OPTIMIZATION CONTROL SYSTEM

(75) Inventors: Takumi Kamioka, Wako (JP); Masanori Takeda, Wako (JP); Mitsuhide Kuroda, Wako (JP); Shigeru Kanzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 13/421,206

(22) Filed: Mar. 15, 2012

(65) Prior Publication Data

US 2012/0254081 A1    Oct. 4, 2012

(30) Foreign Application Priority Data

Mar. 30, 2011   (JP) ................................. 2011-076025

(51) Int. Cl.
*G06N 7/00*   (2006.01)

(52) U.S. Cl.
CPC ...................................... *G06N 7/005* (2013.01)
USPC ........................................................... 706/12

(58) Field of Classification Search
CPC ...................................................... G06N 7/005
USPC ................................................................ 706/12
See application file for complete search history.

(56) References Cited

U.S. PATENT DOCUMENTS 7,315,846 B2 *   1/2008   Hartman et al. ................ 706/16

FOREIGN PATENT DOCUMENTS

JP    08-314883    11/1996
JP    2002-230514    8/2002

* cited by examiner

*Primary Examiner* — Jeffrey A Gaffin
*Assistant Examiner* — Ola Olude Afolabi
(74) *Attorney, Agent, or Firm* — Rankin, Hill & Clark LLP

(57) ABSTRACT

Provided is an optimization control system in an attempt to improve searching accuracy of an optimal solution defining a behavior mode for a control subject. A plan storing element 120 is configured to obtain a current update result of a joint probability distribution p(u, x) on the basis of a current update result of a probability distribution p(x) from a state estimating element 110 and a current update result of the conditional probability distribution p(u|x) from a behavior searching element 200. The behavior searching element 200 is configured to determine the conditional probability distribution p(u|x) as a current basis for obtaining the current update result of the conditional probability distribution p(u|x) on the basis of the current update result of the probability distribution p(x) from the state estimating element 110 and a previous update result of the joint probability distribution p(u, x) from the plan storing element 120.

3 Claims, 7 Drawing Sheets

OPTIMIZATION CONTROL SYSTEM

BACKGROUND OF THE INVENTION

1. Field of the Invention

The present invention relates to an optimization control system configured to determine a behavior for a control subject.

2. Related Background Art

There has been proposed an art configured to search an optimal behavior for a control subject such as a robot or the like according to an evaluation function (refer to Japanese Patents Laid-open No. 2002-230514 and No. H08-314883). A control input for an optimal behavior is determined by solving an optimization problem. The optimization problem is defined as searching for a control subject behavior mode (optimal solution) u* where the evaluation function f(u) denoting the appropriateness of an action or a behavior mode u of the control subject possesses the maximum value (find u*=argmax f(u)).

However, since the solution is searched in a limited sampling period, it is limited to obtain only a temporary solution; therefore, it is difficult to search the optimal solution, and consequently, to apply the optimal solution to the actual control of the control subject.

SUMMARY OF THE INVENTION

The present invention has been accomplished in view of the aforementioned problems, and it is therefore an object of the present invention to provide an optimization control system in an attempt to improve a searching accuracy of an optimal solution defining a behavior mode for a control subject.

The present invention provides an optimization control system configured to determine an optimal behavior for a control subject. The optimization control system of the present invention comprises: a state estimating element configured to update a probability distribution p(x) of a state x according to a determination result of the state x of the control subject each time; a plan storing element configured to update a joint probability distribution p(u, x) of the state x and a behavior u according to the determination result of the state x of the control subject each time; and a behavior searching element configured to iterate the generation of multiple behavior candidates $u_i$ in accordance with a conditional probability distribution p(u|x), an evaluation of a goodness of fit $f_i$ in consideration of an evaluation function f(u|x) of each of the multiple behavior candidates, a selection of a behavior candidate in accordance with the evaluation result, and an update of the conditional probability distribution p(u|x) so as to approach a distribution characteristic of the selected behavior candidate to a shape characteristic of an evaluation function f(u|x) so as to obtain a current update result of the conditional probability distribution p(u|x) and determine an optimal behavior u* the control subject should take in consideration of the goodness of fit, wherein the plan storing element is configured to obtain a current update result of the joint probability distribution p(u, x) on the basis of a current update result of the probability distribution p(x) and the current update result of the conditional probability distribution p(u|x) by the behavior searching element, and the behavior searching element is configured to determine the conditional probability distribution p(u|x) as a current basis for obtaining the current update result of the conditional probability distribution p(u|x) on the basis of the current update result of the probability distribution p(x) from the state estimating element and a previous update result of the joint probability distribution p(u, x) from the plan storing element.

According to the optimization control system of the present invention, the state estimating element mainly assigned to perform the calculation process related to the state x and the behavior searching element mainly assigned to perform the calculation process related to the behavior u mutually utilize the calculation processing result of the other.

Specifically, the plan storing element obtains the current update result of the joint probability distribution p(u, x) on the basis of the current update result of the probability distribution p(x) from the state estimating element and the current update result of the conditional probability distribution p(u|x) from the behavior searching element. Meanwhile, the behavior searching element determines the conditional probability distribution p(u|x) as a current basis for obtaining the current update result of the conditional probability distribution p(u|x) on the basis of the current update result of the probability distribution p(x) from the state estimating element and a previous update result of the joint probability distribution p(u, x) from the plan storing element. In other words, the update of the conditional probability distribution p(u|x) is iterated by utilizing the joint probability distribution p(u, x) which is an accumulation of learning results till the previous time in the plan storing element.

Thereby, each time when the update of the conditional probability distribution p(u|x) is iterated, the joint probability distribution p(u, x) denoting a correlation relationship between the state x and the behavior u is updated to have the shape characteristic thereof approached to the shape characteristic of the evaluation function f(u|x) gradually.

Accordingly, for a control subject which has unknown distribution characteristics of probability variants of each of the state x and the behavior u related to the state x, it is expected to search the optimal solution at each time point and to optimize the solution each time when the search of solution is iterated. For example, in an initial phase, a behavior u* which is not the optimal one but close to the optimal one as close as possible may be determined according to the current determination result of the state x even in a limited sampling period. Thereafter, each time when the update of the conditional probability distribution p(u|x) is iterated after the initial phase, it is possible to optimize the behavior u* which the control subject should take.

At a phase when the difference between the current update result and the previous update result of the joint probability distribution p(u, x) is small and stable to a certain degree, the joint probability distribution p(u, x) is stored in a storing unit; thereafter, on the basis of the determination value of the state x, it is possible to output the optimal behavior for controlling the actions of the control subject according to the joint probability distribution p(u, x).

It is preferred that the state estimating element is configured to update the probability distribution p(x) defined as a linear combination of multiple unimodal probability distributions, and the behavior searching element is configured to update the conditional probability distribution p(u|x) defined as a linear combination of multiple conditional probability distributions having different dependence of mean value with respect to the state x.

According to the optimization control system with the above-mentioned configuration, even for a control subject having a multimodal state probability distribution with multiple maximum values, it is possible to update the probability distributions p(x) to make the probability distributions p(x) conformable to each other according to the determination result of the state x. Therefore, as mentioned in the above, on the basis of the joint probability distribution p(u, x) which is updated according to the update result of the probability distribution p(x), it is possible to determine the optimal behavior u* at the right time point for controlling the control subject.

It is preferred that the behavior searching element be configured to update the conditional probability distribution p(u|x) so as to maximize an expected value E which is an integral value of a product of the evaluation function f(u|x) and the conditional probability distribution p (u|x).

According to the optimization control system with the above-mentioned configuration, the conditional probability distribution p(u|x) is updated so as to maximize the expected value E denoting the similarity between the shape characteristic of the evaluation function f(u|x) and the shape characteristic of the joint probability distribution p(u, x); thereby, the shape characteristic of the joint probability distribution p(u, x) is approached to the shape characteristic of the evaluation function f(u|x). As mentioned in the above, even for a control subject having unknown distribution characteristics of the state x and the behavior u related to the state x, it is expected to optimize the behavior which the control subject should take each time when the update of the joint probability distribution p(u, x) is iterated.

DETAILED DESCRIPTION OF THE PREFERRED EMBODIMENTS

Configuration of an Optimization Control System

Figure 1:
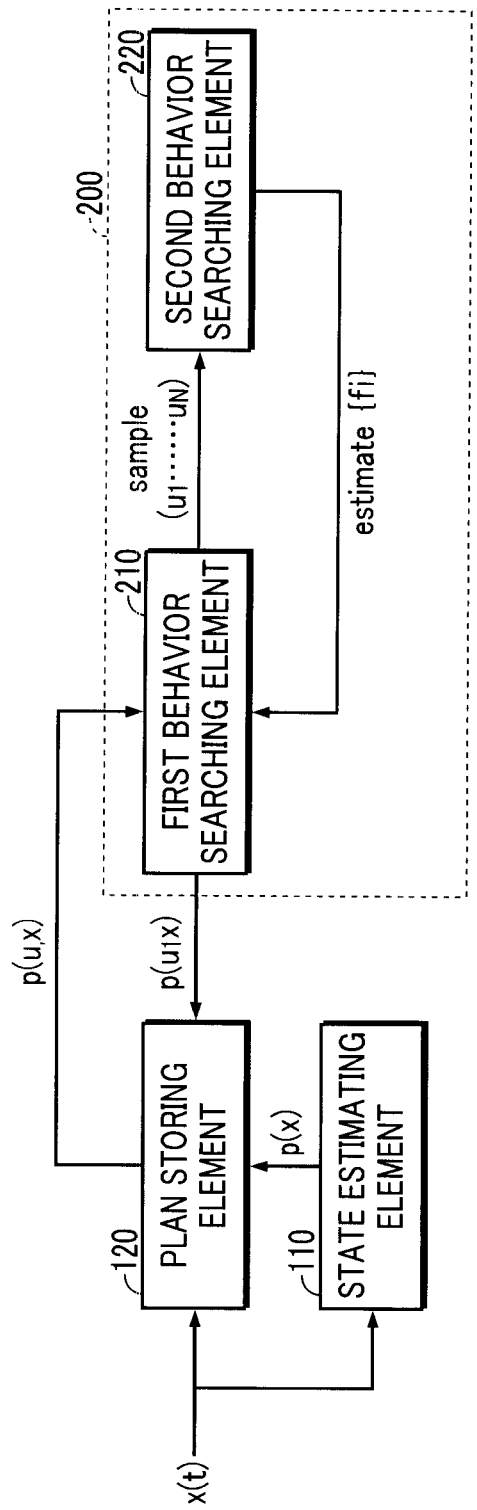
FIG. 1 is an explanatory diagram illustrating a configuration of an optimization control system of the present invention.

An optimization control system illustrated in FIG. 1 as one embodiment of the present invention is comprised of a computer. The optimization control system is provided with a state estimating element 110, a plan storing element 120 and a behavior searching element 200. The behavior searching element 200 is composed of a first behavior searching element 210 and a second behavior searching element 220.

It is acceptable that all of the constituent elements of the optimization control system are constructed from physically common hardware resources or from physically independent hardware resources. For example, it is acceptable that the state estimating element 110 and the plan storing element 120 are constructed from a computer constituting a control subject and the behavior searching element 200 is constructed from a computer independent from the control subject.

The state estimating element 110 is configured to update a probability distribution p(x) of a state x according to a determination result of the state x of the control subject each time.

The plan storing element 120 is configured to update a joint probability distribution p(u, x) of the state x and a behavior u according to the determination result of the state x of the control subject each time. In detail, the plan storing element 120 is configured to obtain a current update result of the joint probability distribution p(u, x) on the basis of a current update result of the probability distribution p(x) from the state estimating element 110 and a current update result of the conditional probability distribution p(u|x) from the behavior searching element 200.

The first behavior searching element 210 is configured to determine the conditional probability distribution p(u|x) as a current basis for obtaining the current update result of the conditional probability distribution p(u|x) on the basis of the current update result of the probability distribution p(x) from the state estimating element 110 and a previous update result of the joint probability distribution p(u, x) from the plan storing element 120. The first behavior searching element 210 is configured to generate multiple behavior candidates $u_i$ according to the conditional probability distribution p(u|x).

The second behavior searching element 220 is configured to evaluate the goodness of fit $f_i$ in consideration of an evaluation function f(u|x) of each of the multiple behavior candidates $u_i$.

The first behavior searching element 210 is configured to select a behavior candidate according to the evaluation result from the second behavior searching element 220. Moreover, the first behavior searching element 210 is configured to update the conditional probability distribution p(u|x) so as to approach the distribution characteristic of the selected behavior candidate to the shape characteristic of the evaluation function f(u|x).

The first behavior searching element 210 is configured to obtain the current update result of the conditional probability distribution p(u|x) after the iterative generation of the multiple behavior candidates $u_i$, the iterative evaluation of the goodness of fit $f_i$ for each behavior candidate $u_i$, the iterative selection of the behavior candidate according to the evaluation result, and the iterative update of the conditional probability distribution p(u|x). Further, the first behavior searching element 210 is configured to determine an appropriate behavior u* as a behavior the control subject should take in consideration of the goodness of fit.

When describing that a constituent element of the present invention is configured to perform an assigned calculation process, it means that the CPU constituting the optimization control system is programmed to retrieve a program (software) from a storing device, and perform the assigned calculation process according to the retrieved program.

On the basis of a learning result of the optimization control system, actions of various apparatus, such as a robot, a vehicle or the like, can be controlled as a control subject.

For example, when the control subject is a humanoid robot disclosed in Domestic re-publication of PCT international application 03/090978 or 03/090979 or the like, a determination value of one or multiple parameters denoting the gait stability or the like of the robot, such as a tilting angle of a base body or the like, may be adopted as an input signal (state) x, and a desired value (a control command value of an actuator for driving the robot) of one or multiple parameters defining the actions for maintaining stable the gait of the robot, such as a joint angle of a leg or the like, may be adopted as an output signal (behavior) u.

Further, when the control subject is a vehicle, a determination value of one or multiple parameters related to the travel stability of the vehicle, such as acceleration of the vehicle body or the like, may be adopted as the input signal x, and a control command value of one or multiple parameters defining the actions for maintaining the travel stability of the vehicle, such as a displacement amount of a clutch, which is a constituent element of a power train, may be adopted as the output signal u.

Functions of the Optimization Control System

A state transition model of one state-one input which is denoted by the expression (01) will be discussed hereinafter.

$$x[k+1]=x[k]-\Delta t(u[k]+\epsilon) \text{ if } x[k]<0, x[k+1]=x[k]+\Delta t(u[k]+\epsilon) \text{ if } 0\leq x[k] \quad (01)$$

The model denotes a variation amount of a next state x[k+1] from a current state x[k] in a sampling period when the actions of the control subject is controlled according to a current behavior u[k] related to the current state x[k]. The variation amount is proportional to the sum of the current behavior u[k] and a noise $\epsilon$ (any number which is not smaller than 0 and not greater than 1, for example).

The evaluation function f is assumed to be denoted by the expression (02).

$$f(u|x)=-\exp\{-(x-\Delta tu)^2\}, \text{ if } x<0, f(u|x)= -\exp\{-(x+\Delta tu)^2\}, \text{ if } 0\leq x \quad (02)$$

Figure 5:
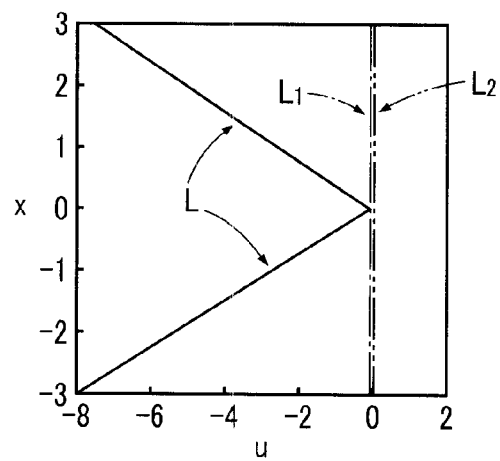
FIGS. 5(a) to 5(c) are diagrams illustrating a relationship between a state linear function and the conditional probability distribution.
Figure 5:
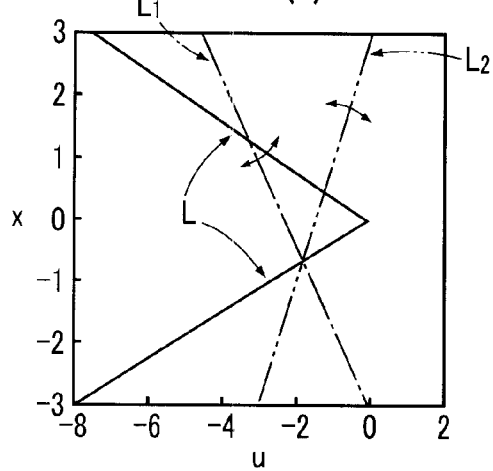
Figure 5:
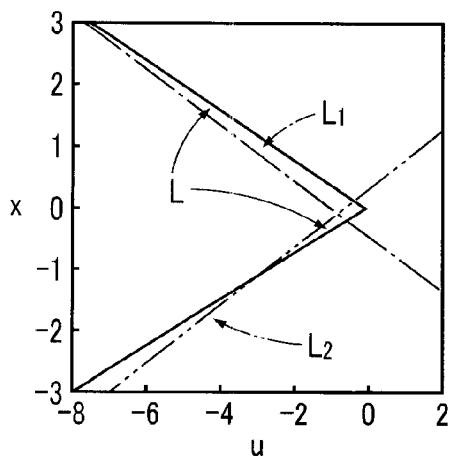
Figure 6:
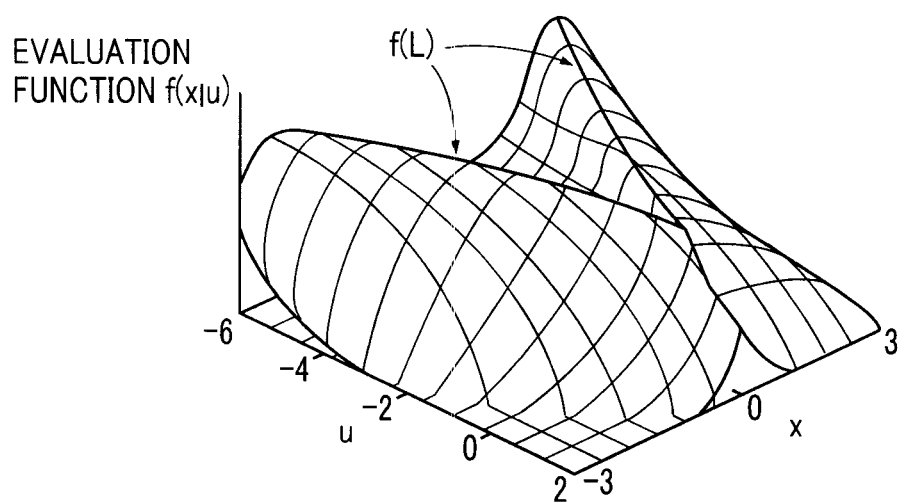
FIG. 6 is a diagram illustrating an evaluation function.

As illustrated in FIG. 6, the evaluation function f(u|x) here is symmetrical about the plane x=0. Further, the evaluation function f(u|x) possesses a pair of line segments having such a property that a distance therebetween along the x direction increases as the value of u decreases in a negative range (u<0) as a ridgeline f(L). As illustrated by the solid lines in FIGS. 5(a) to 5(c), a projection line L of the ridgeline f(L) on the x−u plane is of a roughly V shape which bends at (x, u)=(0, 0) and has symmetry about the straight line x=0.

As to be described later, according to the sequential update of the conditional probability distribution p(u|x) by the behavior searching element 200, the joint probability distribution p(u, x) is sequentially updated to approach gradually to the evaluation function f(u|x) illustrated in FIG. 6 with the state thereof transmitted from FIG. 4(a) to FIG. 4(b) and then to FIG. 4(c) in sequence. The reason for this is that the most appropriate behavior u is caused to be output at each phase according to the state x determined at each sampling period in consideration of the evaluation function f(u|x).

Figure 2:
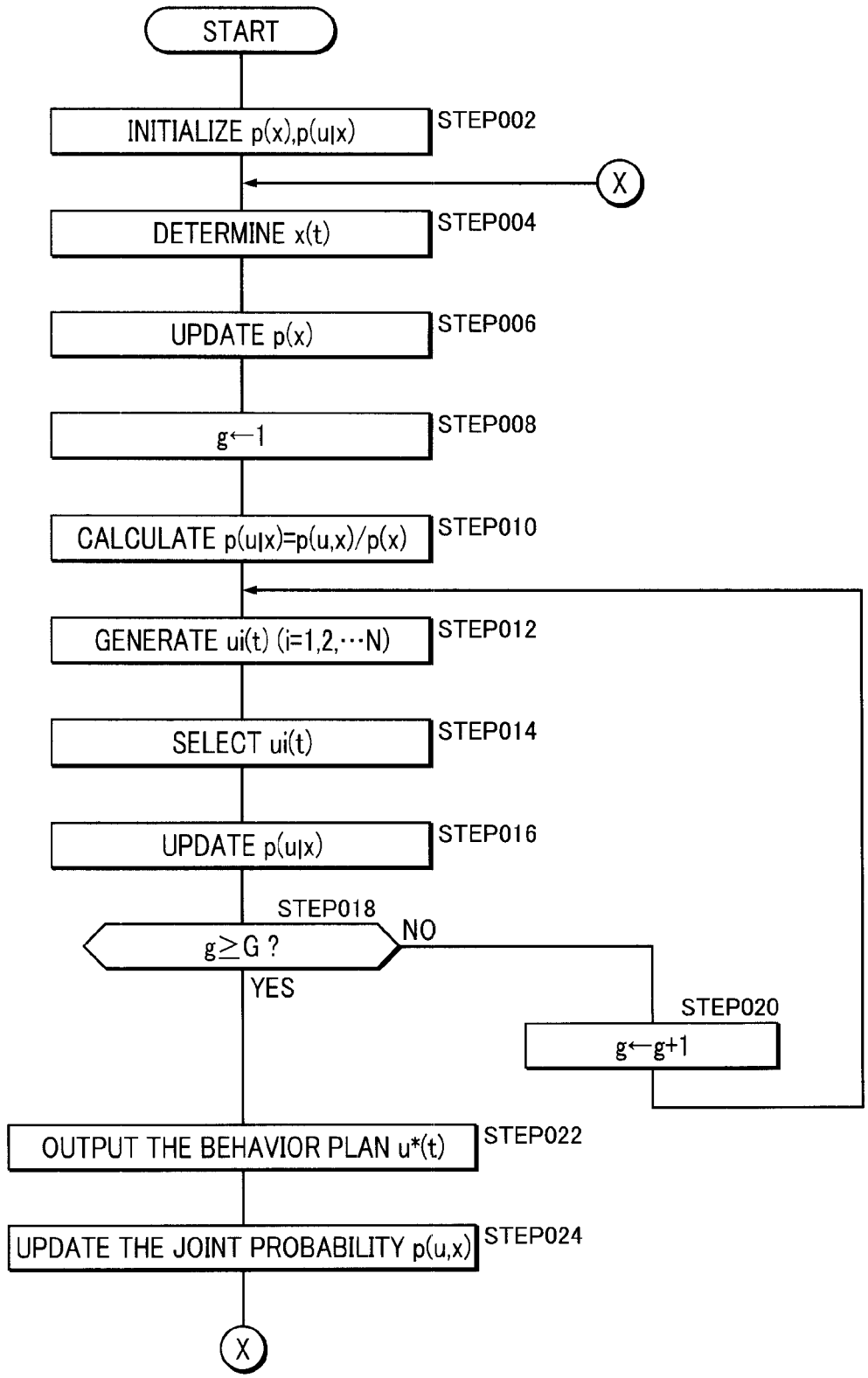
FIG. 2 is a flow chart illustrating an optimization control method of the present invention.

First, the state probability distribution p(x) and the conditional probability distribution p(u|x) are initialized (FIG. 2/STEP 002). Specifically, the value of a parameter $\theta_x=\{\omega_{i,x}, \mu_{i,x}, \Sigma_{i,x}\}$ of the state probability distribution p(x) and an estimation value of a sufficient statistic $S_x\hat{}=\{s\hat{}_{i,k,x}\}$ (k=1, 2, 3) are initialized. Further, the value of a parameter $\theta_{u|x}=\{\omega_{i,u|x}, \mu_{i,u|x}, \Sigma_{i,u|x}\}$ of the conditional probability distribution p(u|x) and an estimation value of a sufficient statistic $S_{u|x}\hat{}=\{s\hat{}_{i,k,u|x}\}$ (k=1, 2, 3) are initialized.

The probability distribution p(x) is defined as a linear combination of M numbers of Gaussian distributions denoted by the expression (03). The probability $p_z(i)=w_{i,x}$, wherein a discrete hidden variable z denoting the Gaussian distributions among the M numbers of Gaussian distributions to be followed by the state x is equal to i, serves as the combination coefficient of the linear combination.

$$p(x) = \sum_{i=1-M} \omega_{i,x}\left\{1/(2\pi)^{D/2}|\Sigma_i|^{1/2}\right\}\exp\left\{-(1/2)(x-\mu i)^T \sum_i^{-1}(x-\mu i)\right\}$$
$$= \sum_{i=1-M} \omega_{i,x} N\left(x\bigg|\mu_{i,x}\sum_{i,x}\right)\left(0\leq \omega_i \leq 1, \sum_{i=1-m}\omega_i=1\right) \quad (03)$$

For example, if M=2, the probability distribution p(x) is defined by the expression (03').

$$p(x)=\omega_{1,x}N(x|\mu_{1,x},\Sigma_{1,x})+\omega_{2,x}N(x|\mu_{2,x},\Sigma_{2,x}) \quad (03')$$

As illustrated by FIG. 3(a), the state probability distribution p(x) here (the solid line) is defined by a linear combination of a first Gaussian distribution $p_1(x)=N(x|\mu_{1,x}, \Sigma_{1,x})$ (the chain line) and a second Gaussian distribution $p_2(x)=N(x|\mu_{2,x}, \Sigma_{2,x})$ (the two-dot chain line). Herein, the mean value $\mu_{1,x}$ of the first Gaussian distribution is a positive value, and the mean value $\mu_{2,x}$ of the second Gaussian distribution is a negative value. It should be noted that the state x is denoted as a variable of one dimension for the purpose of illustration; however, it is acceptable to be denoted as a variable (vector) of multiple dimensions.

As obviously observed from FIG. 3(a), the probability distribution of the state (or the state variable) x serving as the probability variable is denoted by a linear combination of M numbers of Gaussian distributions as a multimodal probability distribution having multiple maximum values but not a unimodal probability distribution having only one maximum value.

The conditional probability distribution p(u|x) is defined by the expression (04) as a weighted sum of M numbers of the linear Gaussian model N $(x|a_ix+b_i, \Sigma_{i,x})$ which possesses a dispersion of $\Sigma_{i,x}$ and a mean value thereof is denoted by the linear function $a_ix+b_i$ of the state x.

$$p(u|x)=\Sigma_{i=1-M}\omega_{i,u|x}N(x|a_ix+b_i,\Sigma_{i,x}),$$
$$\omega_{i,u|x}=\omega_{ix}N(x|\mu_{i,x}\Sigma_{i,x})/\Sigma_{j=1-M}\omega_{jx}N(x|\mu_{j,x}\Sigma_{j,x}) \quad (04)$$

If M=2, the conditional probability distribution p(u|x) is defined by the expression (04') as a weighted sum of a first linear Gaussian model N $(x|a_1x+b_1, \Sigma_{1,x})$ and a second linear Gaussian model N $(x|a_2x+b_2, \Sigma_{2,x})$.

$$p(u|x)=\omega_{1,u|x}N(x|a_1x+b_1,\Sigma_{1,x})+\omega_{2,u|x}N(x|a_2x+b_2,\Sigma_{2,x}),$$
$$\omega_{i,u|x}=\omega_{ix}N(x|\mu_{i,x}\Sigma_{i,x})/\{\omega_{1x}N(x|\mu_{2,x}\Sigma_{2,x})+\omega_{2x}N(x|a_2x+b_2,\Sigma_{2,x})\} \quad (04')$$

As to be described later, the conditional probability distribution p(u|x) is updated by using the joint probability distribution p(u, x). The joint probability distribution p(u, x) is defined by the expression (5) on the basis of the probability distribution p(x) and the conditional probability distribution p(u|x).

$$p(u,x)=p(x)p(u|x)=\Sigma_{i=1-M}\omega_{i,x}N(u,x|\mu_{i,ux}\Sigma_{i,ux}),$$
$$\mu_{i,ux}={}^t(a_i\mu_{i,x}+b_i,\mu_{i,x}),$$
$$\Sigma_{i,ux}=\{Q_{ij}\}, Q_{11}=\Sigma_{i,u|x}+a_i\Sigma_{i,x}{}^{-1}a_i{}^T, Q_{12}=\Sigma_{i,x}a_i{}^T,$$
$$Q_{21}=a_i\Sigma_{i,x}, Q_{22}=\Sigma_{ix} \quad (05)$$

If M=2, the joint probability distribution p(u, x) possesses a first ridgeline $f(L_1)$ and a second ridgeline $f(L_2)$ (refer to the drawings of 4(a) to 4(c)). It should be noted that the behavior u is denoted as a variable of one dimension for the purpose of illustration; however, it is acceptable to be denoted as a variable (vector) of multiple dimensions. Due to the contribution of the first linear Gaussian model $N(x|a_1x+b_1, \Sigma_{1,x})$, the first ridgeline $f(L_1)$ denotes a position where the joint probability distribution p(u, x) possesses a maximum value. Due to the contribution of the second linear Gaussian model N $(x|a_2x+b_2, \Sigma_{2,x})$, the second ridgeline $f(L_2)$ denotes a position where the joint probability distribution p(u, x) possesses a maximum value.

The first linear function $a_1x+b_1$ denotes a first projection line $L_1$ of the first ridgeline $f(L_1)$ on the x−u plane (refer to the drawings of 5(a) to 5(c)). The second linear function $a_2x+b_2$ denotes a second projection line $L_2$ of the second ridgeline $f(L_2)$ on the x−u plane (refer to the drawings of 5(a) to 5(c)). It should be noted that the mean value of each of the first linear Gaussian model and the second linear Gaussian model may be denoted not only by a linear function of the state x but also by a quadratic function or more of the state x.

Figure 4:
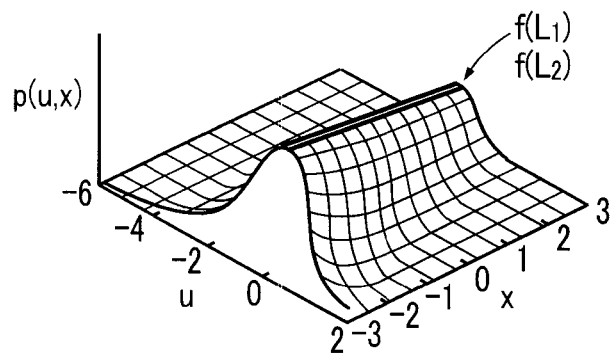
FIGS. 4(a) to 4(c) are diagrams illustrating a conditional probability distribution and the update thereof.
Figure 4:
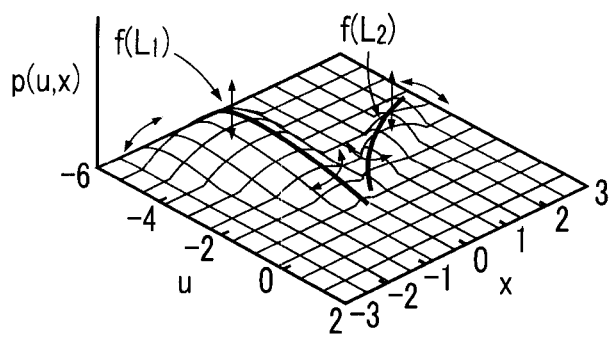
Figure 4:
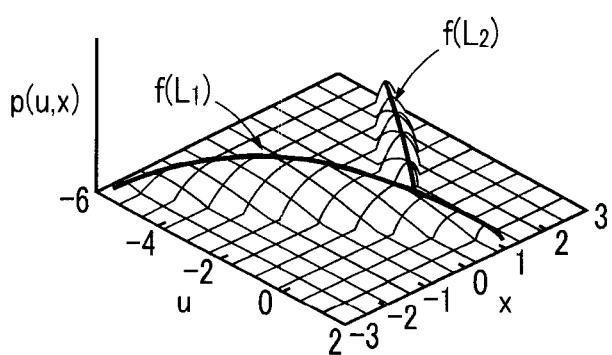

If M=2, and $a_1$=0, $b_1$=0, $a_2$=0 and $b_2$=0 according to the initialization, for example, as illustrated in FIG. 4(*a*), the joint probability distribution p(x, u) possesses a belt which has a width along the x direction and bulges around u=0 along the u direction in the initial phase. In the initial phase, the first ridgeline f($L_1$) matches with the second ridgeline f($L_2$), and the first projection line $L_1$ matches with the second projection line $L_2$ as illustrated in FIG. 5(*a*).

At the sampling time t, the state x(t) is periodically determined or observed (FIG. 2/STEP 004).

The value of the parameter $\theta_x$ and the estimation value $\hat{S_x}$ of the sufficient statistic are updated according to the determined state x(t); thereby, the probability distribution p(x) is updated (FIG. 2/STEP 006).

Therefore, if, for example, the occurrence frequency of the positive values as the determination value of the state x is greater than the occurrence frequency of the negative values thereof, the value of the weighting coefficient $\omega_{1x}$ of the first Gaussian distribution $p_1(x)$ having a positive mean value $\mu_{1x}$ is increased while the value of the weighting coefficient $\omega_{2x}$ of the second Gaussian distribution $p_2(x)$ having a negative mean value $\mu_{2x}$ is decreased. If the determination values of the state x concentrate around a specified positive value, the first Gaussian distribution $p_1(x)$ is updated in such a way that the mean value $\mu_{1x}$ approaches to the specified positive value and the diversion $\Sigma_{1x}$ becomes smaller.

In addition to Gaussian distribution, it is also acceptable to adopt any unimodal probability distribution (having only one maximum value), such as Laplace distribution, Rayleigh distribution, triangular distribution, logistic distribution or the like as a linear combination of probability distributions.

Figure 3:
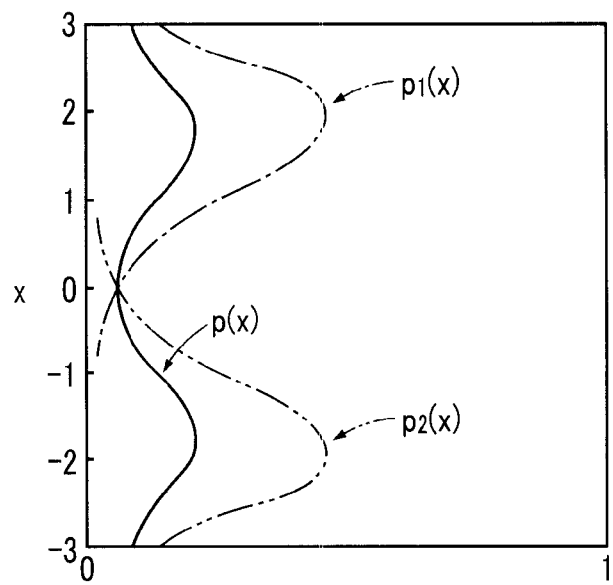
FIG. 3(a) and FIG. 3(b) are diagrams illustrating a state probability distribution and the update thereof.
Figure 3:
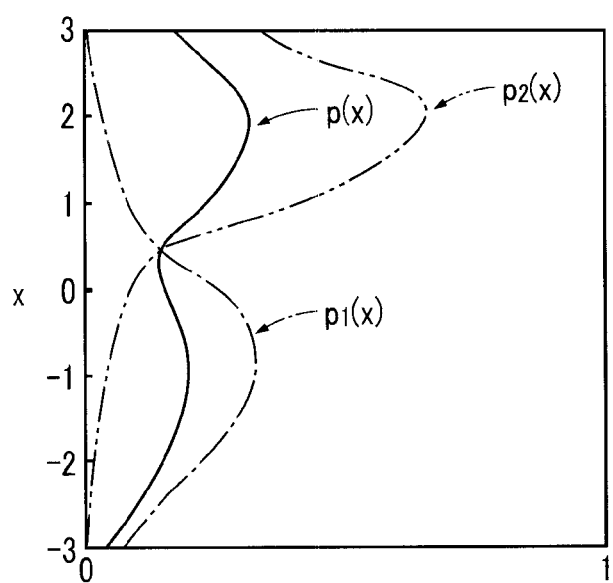

According to the iterative updates, the probability distribution p(x) transmits from the state illustrated in FIG. 3(*a*) to the state illustrated in FIG. 3(*b*).

Subsequently, a flag g denoting the number of update times of the conditional probability distribution p(u|x) is initialized to 1 (FIG. 2/STEP 008); thereafter, the conditional probability distribution p(u|x) is subjected to an update process.

Specifically, the conditional probability distribution p(u|x) is initially updated according to the expression (06) on the basis of the current update result of the probability distribution p(x) and the previous update result of the joint probability distribution p(u, x) (FIG. 2/STEP 010). Here, the previous update result and the current update result refer to the results obtained in a previous sampling period and a current sampling period, respectively. The previous update result of the joint probability distribution p(u, x) is calculated according to the expression (05) on the basis of the previous update result of the probability distribution p(x) and the conditional probability distribution p(u|x) which are related to the previous determination value of the state x, and the calculation result is stored in a storing unit of the system.

$$p(u|x)=p(u,x)/p(x) \quad (06)$$

Thereafter, N numbers of behavior candidates $u_i(t)$ (i=1, 2, ... N) are generated according to the conditional probability distribution p(u|x(t)) (FIG. 2/STEP 012).

Figure 7:
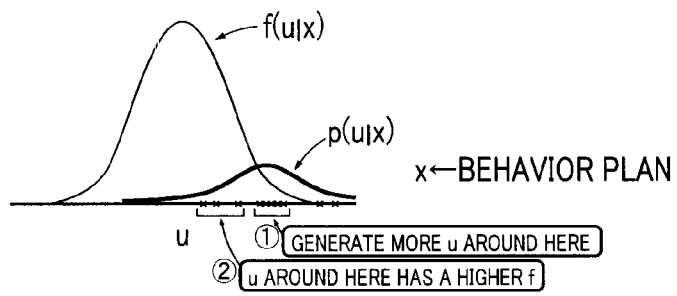
FIGS. 7(a) to 7(d) are diagrams illustrating the generation of behaviors and the update of the conditional probability distribution.
Figure 7:
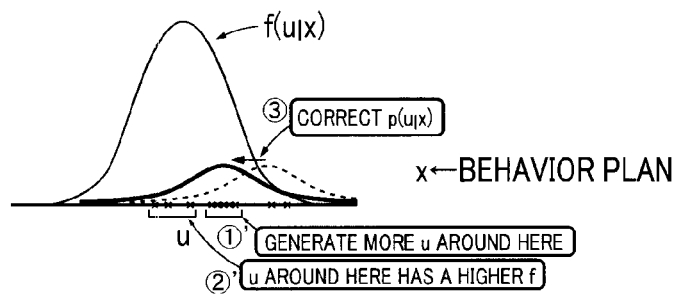
Figure 7:
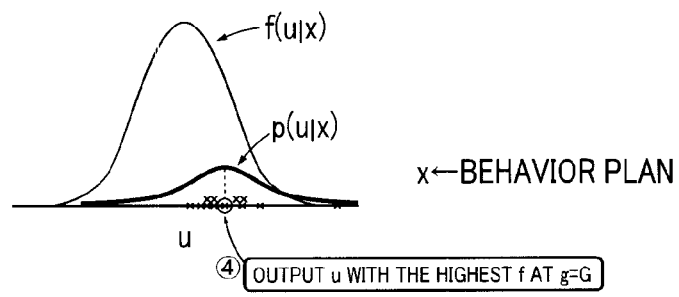
Figure 7:
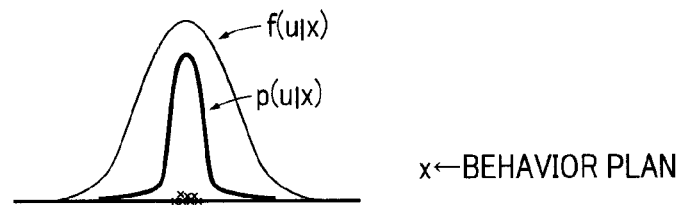

For example, as illustrated in FIG. 7(*a*), at the initial phase, the position where the conditional probability distribution p(u|x(t)) possesses a maximum value deviates from the position where the evaluation function f(u|x(t)) possesses a maximum value. Therefore, at the initial phase, multiple behavior candidates $u_i(t)$ (i=1, 2, ... N) are generated around the position where the conditional probability distribution p(u|x) possesses a maximum value.

Then, the respective goodness of fit $f_1(t), \ldots, f_N(t)$ of the N numbers of the behavior candidates $u_1(t), \ldots, u_N(t)$ are evaluated according to the determined state x(t) and the evaluation function f(u|x), and n (n<N. For example, n=0.25N) numbers of behavior candidates of higher goodness of fit are selected (FIG. 2/STEP 014).

For example, among the multiple behavior candidates $u_i(t)$ marked by "x" in FIG. 7(*a*), the behavior candidates at the left side (negative side) to the position where the conditional probability distribution p(u|x(t)) possesses the maximum value will be selected by priority since the goodness of fit f thereof are evaluated relatively higher.

Thus, the conditional probability distribution p(u|x) is updated to approach to the probability distribution p(u) of the selected behavior candidates (FIG. 2/STEP 016).

Specifically, the parameter $\theta_{u|x}$ of the conditional probability distribution p(u|x) and the estimation value $\hat{S_{u|x}}$ of the sufficient statistics are updated with the aim of maximizing the expected value E. The expected value E is calculated as an integral value of a product of the evaluation function f(u|x) and the conditional probability distribution p(u|x) which are related to the determined state x=x(t). Therefore, the expected value E may be used as an index to denote the similarity level between the shape characteristic of the conditional probability distribution p(u|x) and that of the evaluation function f(u|x).

Multiple expected values E for each different variable combinations ($\theta_{u|x}, \hat{S_{u|x}}$) are calculated, and the conditional probability distribution p(u|x) is updated according to a variable combination ($\theta_{u|x}, \hat{S_{u|x}}$) having the greatest calculation value among the multiple calculation values.

Thereby, the conditional probability distribution p(u|x) is updated while transiting from the initial state illustrated by FIG. 7(*a*) to the state illustrated by FIG. 7(*b*) then to the state illustrated by FIG. 7(*c*) sequentially in such a way that the maximum value thereof is shifted to the region present with the behavior candidate group having relatively higher goodness of fit f related to the state x=x(t). In other words, the conditional probability distribution p(u|x) is updated to have the position denoting the maximum value thereof as illustrated in FIG. 7(*d*) matched with or approximately matched with the position denoting the maximum value of the evaluation function f(u|x) at last.

In order to shift the maximum value of the conditional probability distribution p(u|x), at least the value of one of the parameters (the slope $a_i$ and the intercept $b_i$ (i=1, 2)) for defining the dependent degree of the mean value of the linear Gaussian model N ($x|a_ix+b_i, \Sigma_{i,x}$) with respect to x is updated.

The values of the slope $a_1$ and the intercept $b_1$ should be updated sequentially so as to have the first projection line $L_1$ approximately matched with the ridgeline projection line L of the evaluation function f(u|x) in the positive x region as illustrated in FIG. 5(*c*), for example. Thus, as illustrated by two arrows in FIG. 5(*b*), the slope (posture) and the position (intercepts) of the first projection line $L_1$ are adjusted sequentially.

Similarly, the values of the slope $a_2$ and the intercept $b_2$ should be updated sequentially so as to have the second projection line $L_2$ approximately matched with the ridgeline projection line L of the evaluation function f(u|x) in the negative x region as illustrated in FIG. 5(*c*), for example. Thus, as illustrated by two arrows in FIG. 5(*b*), the slope (posture) and the position (intercepts) of the second projection line $L_2$ are adjusted sequentially.

Whether or not the flag g is equal to or greater than a specified number of times G (for example, 10) is determined (FIG. 2/STEP 018). The specified number of times G is defined according to the possible number of updating times that the conditional probability distribution p(u|x) can be performed in one sampling period.

If the determination result is negative (FIG. 2/STEP 018••NO), namely the number of updating times of the conditional probability distribution p(u|x) is less than the specified number of times, the flag g is increased by 1 (FIG. 2/STEP 020), and the process subsequent to the generation of N numbers of the behavior candidates $u_i(t)$ is iterated (refer to FIG. 2 from STEP 012 to STEP 018).

On the other hand, if the determination result is affirmative (FIG. 2/STEP 018••YES), namely the number of updating times of the conditional probability distribution p(u|x) has reached the specified number of times, at this phase, the behavior candidate having the maximum value or a value most close to the maximum value of the conditional probability distribution p(u|x) is output as the current behavior u*(t) which the control subject should take (FIG. 2/STEP 022).

Thereafter, on the basis of the current update result of the probability distribution p(x) (refer to FIG. 2/STEP 006) and the current update result of the conditional probability distribution p(u|x), the current joint probability distribution p(u, x) is updated according to the expression (05) (FIG. 2/STEP 024 (refer to FIGS. 4(a) to 4(c))).

As described in the above, with the iterative update of the first linear Gaussian model N $(x|a_1x+b_1, \Sigma_{1,x})$ and the second linear Gaussian model N $(x|a_2x+b_2, \Sigma_{2,x})$ (refer to FIG. 5(b)), the joint probability distribution p(u, x) is updated as well with the position, the posture and the shape (height) thereof being altered as illustrated by the two arrows in FIG. 4(b).

The current update result of the joint probability distribution p(u, x) is utilized in a next update of the conditional probability distribution p(u|x) (refer to FIG. 2/STEP 010).

Thereafter, a sequence of processes from the determination of the state x to the output of the behavior u*(t) is performed iteratively at each sampling timing t (refer to FIG. 2/STEP 004 to STEP 024).

Effect of the Present Invention

According to the optimization control system of the present invention, the state estimating element 110 and the plan storing element 120 mainly assigned to perform the calculation process relating to the state x, and the behavior searching element 200 mainly assigned to perform the calculation process relating to the behavior u utilize the calculation processing result of the other party mutually.

Specifically, the plan storing element 120 obtains the current update result of the joint probability distribution p(u, x) (refer to FIG. 2/STEP 024) on the basis of the current update result of the probability distribution p(x) from the state estimating element 110 (refer to FIG. 2/STEP 006) and the current update result of the conditional probability distribution p(u|x) from the behavior searching element 200 (refer to FIG. 2/STEP 016).

Meanwhile, the behavior searching element 200 determines the conditional probability distribution p(u|x) as a current basis for obtaining the current update result of the conditional probability distribution p(u|x) (refer to FIG. 2/STEP 010) on the basis of the current update result of the probability distribution p(x) from the state estimating element 110 (refer to FIG. 2/STEP 006) and the previous update result of the joint probability distribution p(u, x) from the plan storing element 120 (refer to FIG. 2/STEP 024).

In other words, the behavior searching element 200 iterates the update of the conditional probability distribution p(u|x) by utilizing the joint probability distribution p(u, x) which is an accumulation of learning results till the previous time in the plan storing element 110. According to the above embodiment, the position and the posture of each of the first ridgeline projection line $L_1$ and the second ridgeline projection line $L_2$ are not reset back to the initial state (refer to FIG. 5(a)) every sampling period but altered every G number of times in the current sampling period on the basis of the end state of a previous sampling period (refer to FIG. 5(b)).

Consequently, the joint probability distribution p(u, x) will not be reset back to the initial state (refer to FIG. 4(a)) every sampling period but altered in the current sampling period on the basis of the end state of a previous sampling period (refer to FIG. 4(b)).

Thereby, each time when the update of the conditional probability distribution p(u|x) is iterated by the plan storing element 110, the joint probability distribution p(u, x) denoting a correlation relationship between the state x and the behavior u is updated by the behavior searching element 200 to have the shape characteristic thereof approached to the shape characteristic of the evaluation function f(u|x) gradually (refer to FIGS. 4(a) to 4(c) and FIG. 6).

Accordingly, for a control subject which has unknown distribution characteristics of probability variants of each of the state x and the behavior u related to the state x, it is expect to search the optimal solution at each time point (each sampling timing) and to optimize the solution (behavior u*) each time when the search of solution is iterated. For example, in an initial phase, a behavior u* which is not the optimal one but close to the optimal one as possible may be determined according to the current determination result of the state x even in a limited sampling period. Thereafter, each time when the update of the joint probability distribution p(u, x) is iterated after the initial phase, it is possible to optimize the behavior u* which the control subject should take.

At a phase when the difference between the current update result and the previous update result of the joint probability distribution p(u, x) is small and stable to a certain degree, the joint probability distribution p(u, x) is stored in a storing unit; thereafter, on the basis of the determination value of the state x, it is possible to output the optimal behavior for controlling the actions of the control subject according to the joint probability distribution p(u, x).

The probability distribution p(x) is defined as a linear combination of multiple unimodal probability distributions (refer to the expression (03), FIG. 3(a) and FIG. 3(b)). Moreover, the conditional probability distribution p(u|x) is defined as a linear combination of multiple conditional probability distributions having different dependence of mean value with respect to the state x (refer to the expression (04), FIG. 4(a) to FIG. 4(c) and FIG. 5(a) to FIG. 5(c)).

Accordingly, even for a control subject having a multimodal state probability distribution with multiple maximum values, it is possible to update the probability distributions p(x) updated according to the determination result of the state x to have consistency (refer to FIG. 3(a) and FIG. 3(b)). Therefore, as mentioned in the above, on the basis of the joint probability distribution p(u, x) which is updated according to the update result of the probability distribution p(x), it is possible to determine the optimal behavior u* at each time point for controlling the control subject.

What is claimed is:

1. An optimization control system configured to determine an optimal behavior for a control subject, comprising at least one processor, the at least one processor comprising:
- a state estimating element configured to update a probability distribution p(x) of a state x according to a determination result of the state x of the control subject each time;
- a plan storing element configured to update a joint probability distribution p(u, x) of the state x and a behavior u according to the determination result of the state x of the control subject each time; and
- a behavior searching element configured to iterate a generation of multiple behavior candidates u.sub.i in accordance with a conditional probability distribution p(u|x), an evaluation of a goodness of fit f.sub.i in consideration of an evaluation function f(u|x) of each of the multiple behavior candidates, a selection of a behavior candidate in accordance with the evaluation result, and an update of the conditional probability distribution p(u|x) so as to approach a distribution characteristic of a selected behavior candidate to a shape characteristic of the evaluation function f(u|x) so as to obtain a current update result of the conditional probability distribution p(u|x) and to determine an optimal behavior u* as a behavior which the control subject should take in consideration of the goodness of fit,
- wherein the plan storing element is configured to obtain a current update result of the joint probability distribution p(u, x) on the basis of a current update result of the probability distribution p(x) and the current update result of the conditional probability distribution p(u|x) by the behavior searching element, and the behavior searching element is configured to determine the conditional probability distribution p(u|x) as a current basis for obtaining the current update result of the conditional probability distribution p(u|x) on the basis of the current update result of the probability distribution p(x) from the state estimating element and a previous update result of the joint probability distribution p(u, x) from the plan storing element.

2. The optimization control system according to claim 1, wherein
- the state estimating element is configured to update the probability distribution p(x) defined as a linear combination of multiple unimodal probability distributions, and
- the behavior searching element is configured to update the conditional probability distribution p(u|x) defined as a linear combination of multiple conditional probability distributions having different dependence of mean value with respect to the state x.

3. The optimization control system according to claim 1, wherein
- the behavior searching element is configured to update the conditional probability distribution p(u|x) so as to maximize an expected value E which is an integral value of a product of the evaluation function f(u|x) and the conditional probability distribution p(u|x).

* * * * *